United States Patent
Moore (10) Patent No.: US 10,100,719 B2
(45) Date of Patent: Oct. 16, 2018

(54) GDCI INTAKE AIR TEMPERATURE CONTROL SYSTEM AND METHOD

(71) Applicant: DELPHI TECHNOLOGIES IP LIMITED, St. Michael (BB)

(72) Inventor: Wayne R. Moore, Goodrich, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 163 days.

(21) Appl. No.: 15/212,882

(22) Filed: Jul. 18, 2016

(65) Prior Publication Data

US 2018/0016967 A1 Jan. 18, 2018

(51) Int. Cl.
| | |
|---|---|
| F02B 33/44 | (2006.01) |
| F02M 35/10 | (2006.01) |
| F02B 29/04 | (2006.01) |
| F02D 41/00 | (2006.01) |
| F02D 41/14 | (2006.01) |
| F02M 35/108 | (2006.01) |

(52) U.S. Cl.
CPC .......... *F02B 33/44* (2013.01); *F02B 29/0418* (2013.01); *F02D 41/0007* (2013.01); *F02D 41/144* (2013.01); *F02M 35/108* (2013.01); *F02M 35/1038* (2013.01); *F02M 35/10157* (2013.01); *F02M 35/10255* (2013.01); *F02M 35/10268* (2013.01)

(58) Field of Classification Search
CPC .. F02B 33/44; F02B 29/0418; F02D 41/0007; F02D 41/144; F02M 35/10157; F02M 35/10255; F02M 35/10268; F02M 35/1038; F02M 35/108

USPC ................ 60/611, 605.1; 123/556, 542, 549
See application file for complete search history.

(56) References Cited

U.S. PATENT DOCUMENTS

| | | | | |
|---|---|---|---|---|
| 6,276,334 | B1 * | 8/2001 | Flynn ................... | F02B 29/0418 123/435 |
| 6,701,710 | B1 * | 3/2004 | Ahrens .................... | F02B 37/00 60/611 |
| 6,722,128 | B1 * | 4/2004 | Adrian .................... | F02B 37/16 60/611 |
| 6,810,667 | B2 * | 11/2004 | Jung ....................... | F02B 37/16 60/611 |
| 6,813,887 | B2 * | 11/2004 | Sumser ................... | F02B 33/44 60/611 |
| 7,080,511 | B1 * | 7/2006 | Bolton ................ | F02D 41/0007 60/611 |
| 7,222,614 | B2 * | 5/2007 | Bryant ................ | F02B 29/0418 123/559.1 |

(Continued)

*Primary Examiner* — Thai Ba Trieu
(74) *Attorney, Agent, or Firm* — Joshua M. Haines (57) ABSTRACT

A GDCI engine control system provides rapid heating of intake air to the combustion chamber when the engine is cold. The engine uses an intake air pathway that includes a compressor having a compressor inlet and a compressor outlet. A loop fluidly connects the compressor outlet to the compressor inlet. First and second valves are arranged in the loop and are arranged near the compressor outlet and the compressor inlet respectively. First and second passages converge at a first junction, and the first passage fluidly connects the first valve and the first junction. The second passage fluidly connects to the loop at a second junction arranged fluidly between the first and second valves. An intake air heat exchanger is arranged in the first passage and fluidly between the first valve and the first junction.

17 Claims, 6 Drawing Sheets

(56) References Cited

U.S. PATENT DOCUMENTS

| | | | | |
|---|---|---|---|---|
| 7,254,948 B2* | 8/2007 | Gustafson | ............ | F02B 29/0418 60/611 |
| 7,621,262 B2* | 11/2009 | Zubeck | ............... | F02B 29/0418 123/543 |
| 8,375,714 B2* | 2/2013 | Gokhale | ................. | F02B 37/18 60/611 |
| 8,707,923 B2* | 4/2014 | Vigild | ............. | F02M 35/10268 123/556 |
| 8,726,659 B2* | 5/2014 | Chu | ................. | F02M 35/10157 60/611 |
| 2003/0000507 A1* | 1/2003 | Kobayashi | .............. | F02B 37/16 123/568.21 |
| 2011/0056199 A1* | 3/2011 | Gokhale | ................. | F02B 33/44 60/602 |
| 2012/0291760 A1* | 11/2012 | Vigild | ............. | F02M 35/10268 123/542 |
| 2014/0053547 A1* | 2/2014 | Wade | ...................... | F02B 33/44 123/559.1 |
| 2014/0157774 A1* | 6/2014 | McConville | ........... | F02B 37/164 60/611 |
| 2015/0128907 A1* | 5/2015 | Redon | ................. | F02D 41/0002 123/46 R |
| 2016/0131065 A1* | 5/2016 | Ossareh | .............. | F02D 41/0007 701/103 |
| 2017/0051659 A1* | 2/2017 | Banker | ................ | F02B 29/0418 |
| 2017/0107920 A1* | 4/2017 | Roth | ................... | F02D 41/0007 |
| 2017/0114748 A1* | 4/2017 | Roth | ................... | F02D 41/0057 |
| 2018/0016993 A1* | 1/2018 | Moore | ................ | F02D 41/1447 |

\* cited by examiner

GDCI INTAKE AIR TEMPERATURE CONTROL SYSTEM AND METHOD

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to an engine control system used to control intake air temperature in a Gasoline Direct-Injection Compression-Ignition (GDCI) engine.

GDCI engines are highly dependent on intake air temperature since the engine relies on the kinetically driven autoignition process. Autoignition is difficult to control when the engine is cold before reaching steady state operating temperature.

One example GDCI engine control system uses a charge air cooler arranged fluidly between a supercharger and an intake manifold of the engine. Electric intake manifold port heaters can be used to heat the intake air downstream from the charge air cooler prior to entering the combustion chamber, but the heaters are a parasitic loss on the engine from increased electrical loads.

The supercharger can be used to heat the intake air. A bypass loop is used to circumvent the supercharger when hot compressed air is not desired. This configuration may provide a slower than desired response to increase intake air temperature as all air must pass through the charge air cooler.

SUMMARY

In one exemplary embodiment, an engine control system includes an intake manifold configured to supply intake air to a combustion chamber. A sensor is configured to detect a temperature associated with the intake air. A compressor includes a compressor inlet and a compressor outlet. An intake air heat exchanger is fluidly arranged between the compressor outlet and the intake manifold. A recirculation passage fluidly interconnects the compressor outlet to the compressor inlet. A heat exchanger bypass passage fluidly interconnects the recirculation passage to the intake manifold and bypasses the intake air heat exchanger. A charge air bypass valve arranged downstream from the compressor outlet and configured to regulate the flow of fluid from the compressor outlet to intake air heat exchanger and through the recirculation and heat exchanger bypass passages. A compressor bypass valve is arranged in the recirculation passage and configured to regulate the flow of air therethrough. A controller is in communication with the sensor and the charge air and compressor bypass valves. The controller is configured to provide a first command to the charge air bypass valve and a second command to the compressor bypass valve in response to the detected temperature relative to a desired temperature to regulate flow of intake air through the recirculation and heat exchanger bypass passages and supply a desired temperature intake air to the combustion chamber.

In a further embodiment of the above, the sensor is a temperature sensor provided in the intake manifold.

In a further embodiment of any of the above, the compressor is a supercharger.

In a further embodiment of any of the above, the supercharger is arranged fluidly downstream from a turbocharger. A first charge air cooler is arranged fluidly between the turbocharger and the supercharger. The intake air heat exchanger provides a second charge air cooler.

In a further embodiment of any of the above, the first valve is a three-way valve.

In a further embodiment of any of the above, the second valve is a two-way valve.

In a further embodiment of any of the above, at least one electric heater is provided in the second passage.

In a further embodiment of any of the above, the second passage is provided by a secondary intake manifold fluidly connected to the intake manifold upstream from the intake air heat exchanger. At least one electric heater is arranged in the secondary intake manifold.

In a further embodiment of any of the above, the secondary intake manifold has multiple secondary intake ports each respectively fluidly connected to a combustion chamber. The electric heater is arranged in each of the secondary intake ports.

In a further embodiment of any of the above, the intake air temperature is below a first desired temperature. The controller is configured to actuate at least one of the first and second valves to recirculate the fluid from the compressor outlet to the compressor inlet and bypass the intake air heat exchanger with fluid from the compressor outlet to increase intake air temperature to the combustion chamber to the desired temperature intake air.

In a further embodiment of any of the above, the intake air temperature is above a second desired temperature. The controller is configured to actuate at least one of the first and second valves to supply fluid from the compressor outlet to the intake air heat exchanger and recirculate intake air downstream from the intake air heat exchanger to the compressor inlet to decrease fluid temperature at the compressor outlet.

In another exemplary embodiment, an internal combustion engine intake air pathway includes a compressor that has a compressor inlet and a compressor outlet. A loop fluidly connects the compressor outlet to the compressor inlet. First and second valves are arranged in the loop and arranged near the compressor outlet and the compressor inlet respectively. First and second passages converge at a first junction. The first passage fluidly connects the first valve and the first junction. The second passage fluidly connects to the loop at a second junction arranged fluidly between the first and second valves. An intake air heat exchanger is arranged in the first passage and fluidly between the first valve and the first junction.

In a further embodiment of any of the above, the compressor is a supercharger.

In a further embodiment of any of the above, the supercharger is arranged fluidly downstream from a turbocharger.

In a further embodiment of any of the above, a first charge air cooler is arranged fluidly between the turbocharger and the supercharger. The intake air heat exchanger provides a second charge air cooler.

In a further embodiment of any of the above, the first valve is a three-way valve.

In a further embodiment of any of the above, the second valve is a two-way valve.

In a further embodiment of any of the above, at least one electric heater is provided in the second passage.

In another exemplary embodiment, a method of controlling intake air temperature for an internal combustion engine includes the steps of comparing an intake air temperature relative to a desired temperature and circulating fluid through a loop fluidly connecting a compressor outlet to a compressor inlet. At least one of first and second valves in the loop is controlled in order to control fluid flow in relation to an intake air heat exchanger to deliver a desired intake air temperature to a combustion chamber.

In a further embodiment of any of the above, the comparing step includes identifying the intake air temperature is below a first desired temperature. The controlling step includes actuating at least one of the first and second valves to recirculate the fluid from the compressor outlet to the compressor inlet and bypass the intake air heat exchanger with fluid from the compressor outlet to increase intake air temperature to the combustion chamber to the desired intake air temperature.

In a further embodiment of any of the above, the comparing step includes identifying the intake air temperature is above a second desired temperature. The controlling step includes actuating at least one of the first and second valves to supply fluid from the compressor outlet to the intake air heat exchanger and recirculate intake air downstream from the intake air heat exchanger to the compressor inlet to decrease fluid temperature at the compressor outlet.

In a further embodiment of any of the above, the compressor is a supercharger.

In a further embodiment of any of the above, the first valve is a three-way valve.

In a further embodiment of any of the above, the second valve is a two-way valve.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
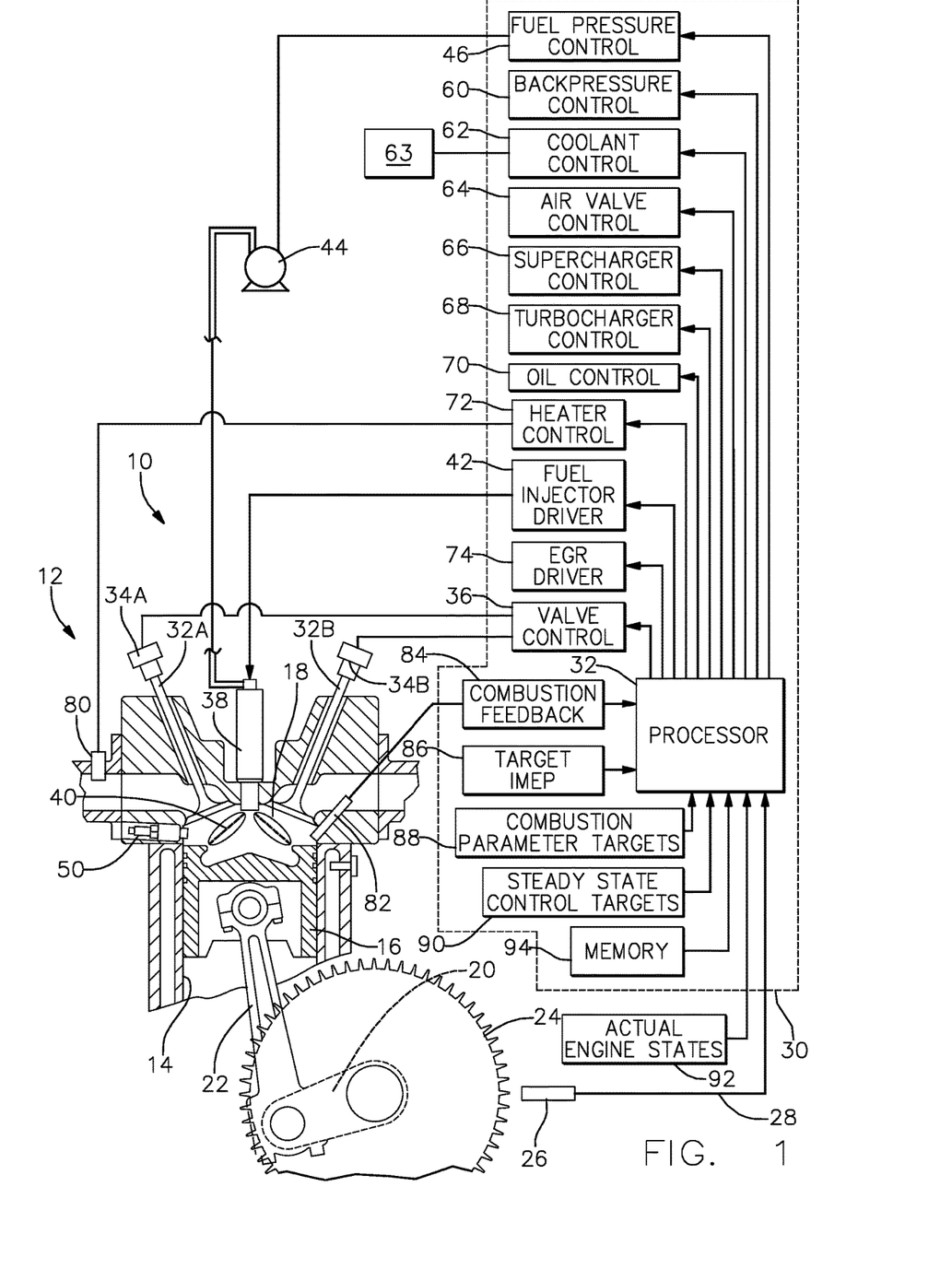
FIG. 1 is a schematic view of an embodiment of an engine control system suitable for controlling a GDCI engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, entitled "High-Efficiency Internal Combustion Engine and Method for Operating Employing Full-Time Low-Temperature Partially-Premixed Compression Ignition with Low Emissions," which is incorporated herein by reference in its entirety. This distributed-equivalence-ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16, wherein the region above the piston 16 defines a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle, which corresponds to the linear position of the piston 16, and a crank speed.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are driven by one or more camshafts to regulate the flow of air into and exhaust from the combustion chamber 18. In one embodiment, a cam phaser 34A, 34B is respectively coupled to each of the intake valve 32A and the exhaust valve 32B, to provide further control of lift and/or duration of the valves beyond that provided by the camshaft profile. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of the engine crank angle, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially mixed-mixture, low-temperature combustion process is used. Fuel 40 is injected by the fuel injector 38, where the fuel injector is fed by a fuel rail at a pressure in the range of 100 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
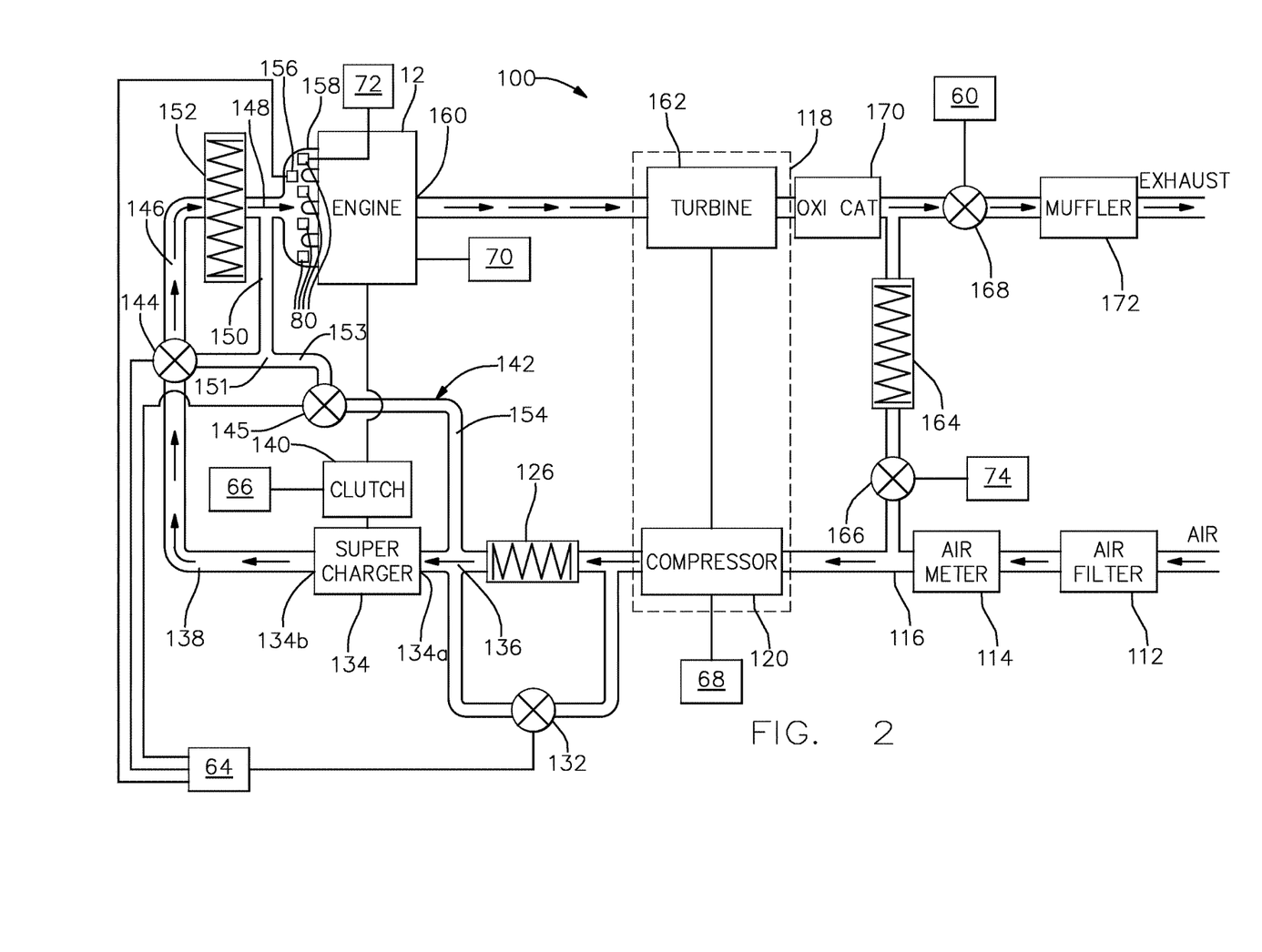
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a compressor 134, hereinafter embodied and referred to as supercharger 134. A first charge air cooler bypass valve 132 is connected between an air inlet and an air outlet of the first charge air cooler 126 to selectively divert air around the first charge air cooler 126.

Air from first charge air cooler 126 is channeled to the compressor inlet 134A of a supercharger 134, which is driven by the engine 12 through a controllable clutch 140 in communication with a supercharger control 66 (FIG. 1). The air from the compressor outlet 134B of the supercharger 134 is channeled to a second charge air cooler 152, or intake air heat exchanger, and/or an air intake manifold 158 of the engine 12 via a first valve 144 that acts as a charge air bypass valve. In one example, a second valve 145 provides a compressor bypass valve configured to regulate the flow of air around the supercharger 134 when the supercharger is not driven by the clutch 140. An air valve control 64 (FIG. 1) is in communication with the first charge air cooler bypass valve 132, supercharger bypass valve 145 and second charge air cooler bypass valve 144 to coordinate the flow of air therethrough.

An air intake heater 80 is arranged in each of an intake runner of the air intake manifold 158. Each air intake heater 80 is in communication with a heater control 72 (FIG. 1) and is configured to heat air at the intake port of a corresponding cylinder 14 of the engine 12. Alternatively, a single heat source may be disposed in the air intake manifold 158 so as to heat air supplied to all of the intake ports of the engine 12.

With continuing reference to FIG. 2, following a combustion event, exhaust gas exits one or more exhaust ports 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 166 that is controlled by an EGR driver 74 (FIG. 1), to be reintroduced into the intake air stream at air duct 116. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

Returning to FIG. 2, an upstream passage 136 provides air to the compressor inlet 134A of the supercharger 134. It should be understood that a turbocharger can be used in addition to (as shown) or instead of a supercharger. Charge air from the compressor outlet 134B is supplied to a downstream passage 138. A loop 142 provides a recirculation passage that fluidly connects the compressor outlet 134B to the compressor inlet 134A when the clutch 140 is engaged and rotationally driving the supercharger 134. The loop 142 includes at least the downstream passage 138 and first and second passageways 153, 154.

First and second valves 144, 145 are arranged in the loop 142 and are arranged respectively near the compressor outlet 134B and the compressor inlet 134A. In the example, the first valve 144 fluidly separates the downstream passage 138 and the first passageway 153, and the second valve 145, a two-way valve, fluidly separates the first and second passageways 153, 154. Bypass valve 145 is primarily used to regulate the boost pressure, or manifold absolute pressure (MAP), of the engine. The first valve 144 also separates passage 138 from passage 146 allowing flow to be proportioned between passage 146 and passage 153.

If a variable vane turbocharger (VVTC) or a variable speed supercharger is used for as the supercharger 134, the loop 142, first and second passages 153, 154, and bypass valve 145 may not be needed.

Figure 4:
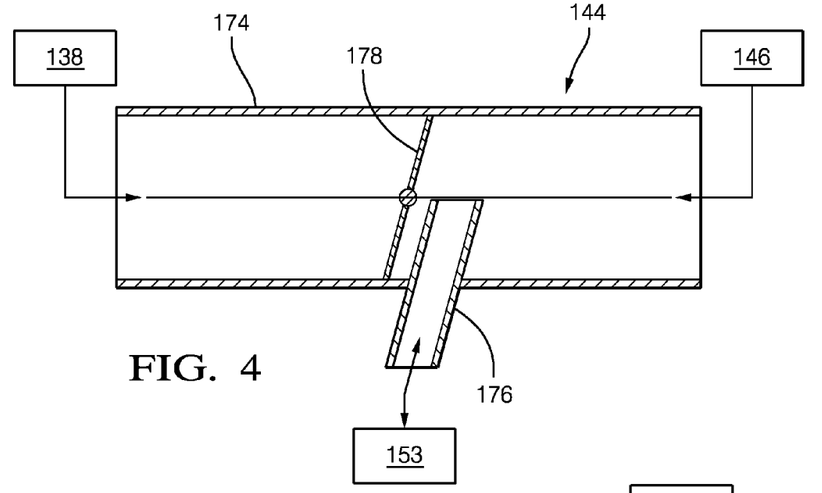
FIG. 4 is a schematic view of a three-way valve shown in FIG. 2.

FIG. 4 illustrates one example first valve 144, an example of which is disclosed in U.S. patent application Ser. No. 14/824,239, entitled "Control Valve," which is incorporated herein by reference in its entirety. A second conduit 176 intersects a first conduit 174. A flap 178 is rotatable about a pivot to regulate the flow through the first and second conduits 174, 176. The first valve 144 is a three-way valve that includes at least two positions (first conduit 174 fully closed with second conduit 176 fully open, or first conduit 174 fully open with second conduit 176 fully closed) and positions therebetween, if desired, to regulate the flow of charge air through or around the intake air heat exchanger 152.

First and second passages 146, 150 converge at a first junction 148. The first passage 146 fluidly connects the first valve 144 to the first junction 148. The second passage 150 fluidly connects to the loop 142 at a second junction 151 arranged fluidly between the first and second valves 144, 145. The intake air heat exchanger 152 is arranged in the first passage 146 and fluidly between the first valve 144 and the first junction 148. The second passage 150 acts as a heat exchanger bypass passage to permit charge air from the supercharger 134 to bypass the intake air heat exchanger 152.

Figure 3A:
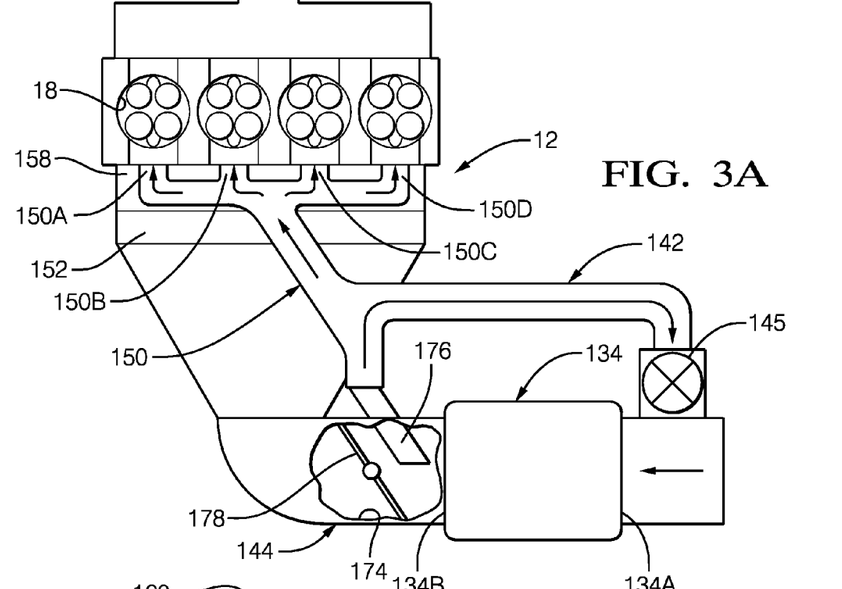
FIG. 3A is a schematic view of a portion of an intake air pathway operating in a heating mode.
Figure 5:
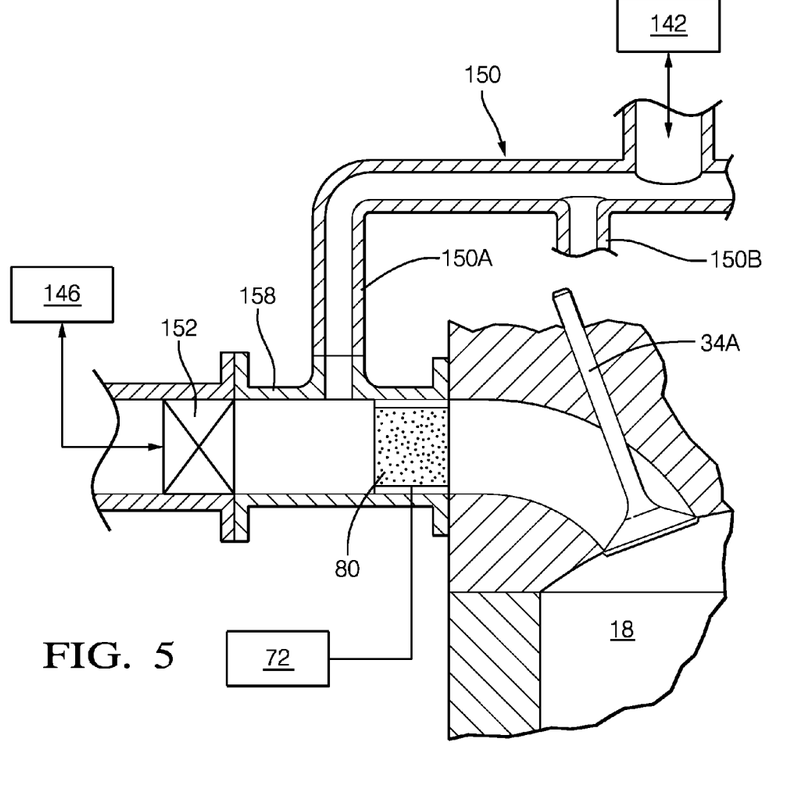
FIG. 5 is a schematic cross-sectional view of a portion of the intake air pathway shown in FIG. 2.

Referring to FIGS. 3A and 5, the second passage 150 is provided by a secondary intake manifold that has multiple secondary intake ports 150A, 150B, 150C, 150D, which correspond to each respective combustion chamber 18. The secondary intake ports are arranged upstream from the combustion chamber 18 and downstream from the intake air heat exchanger 152.

Figure 7:
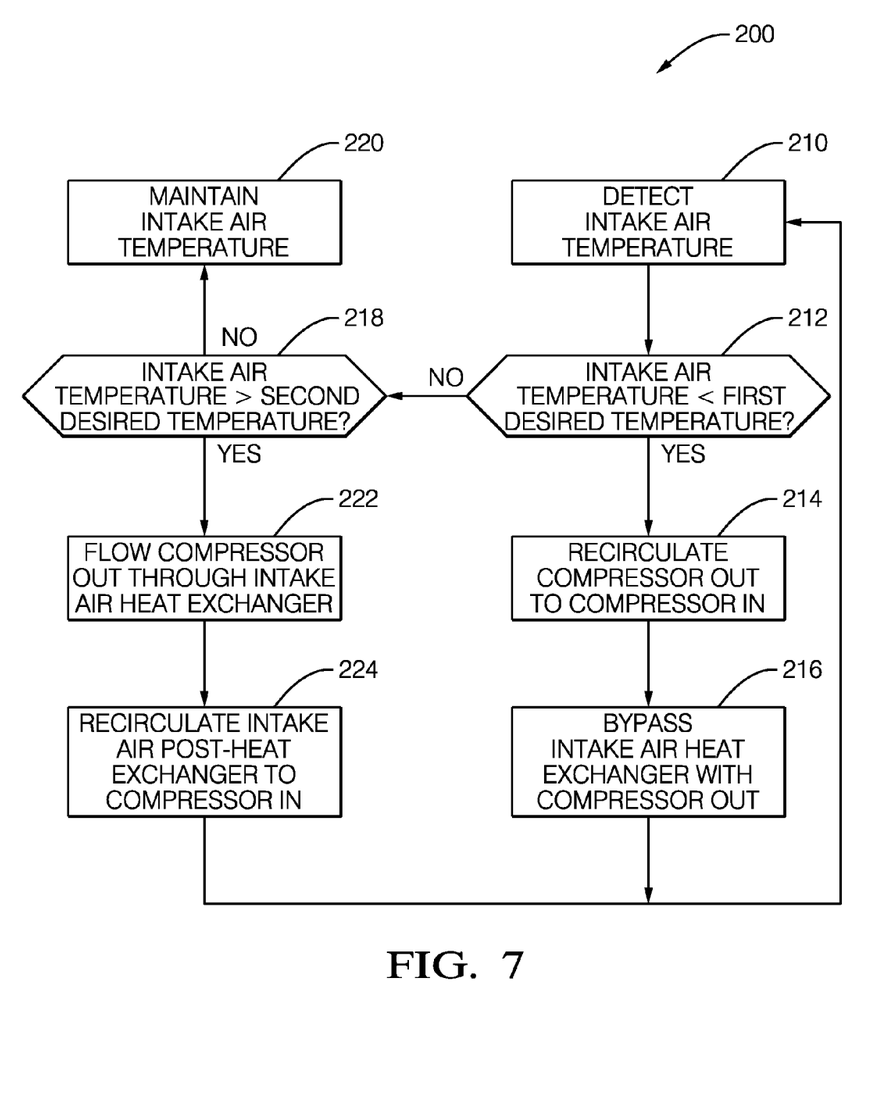
FIG. 7 is a method of controlling intake air temperature in the intake air pathway shown in FIGS. 2-3B.

A method 200 of controlling intake air temperature for an internal combustion engine is shown in FIG. 7. Since intake air temperature is important to the combustion process and initiation of autoignition, it is desirable to detect intake air temperature (block 210), either by measurement or estimate. In one example, a temperature sensor 156 is arranged in the intake manifold 158 to detect intake air temperature prior to entering the combustion chamber 18, as shown in FIG. 3A. In operation, the controller 30 uses the intake air temperature sensor 156 to compare the intake air temperature relative to a desired temperature. The controller 30 regulates the first and second valves 144, 145 in the loop 142 via first and second commands respectively to control the flow of fluid in relation to the intake air heat exchanger 152 and deliver a desired intake air temperature to the combustion chamber 18.

Referring to FIGS. 3A and 7, if the intake air temperature is too cold, that is, below a first desired temperature (block 212), the intake air pathway is configured using the first and second valves 144, 145 to provide a heating mode. In the heating mode, the air is recirculated from the compressor outlet 134B to the compressor inlet 134A (block 214) through an open second valve 145. Additionally, fluid bypasses the intake air heat exchanger 152 from the compressor outlet 134 (block 216) to deliver the heated air to the secondary intake ports 150A, 150B, 150C, 150D. As a result, the recirculated compressed air through the supercharger 134 can rapidly heat the intake air. Bypassing the intake air heat exchanger 152 avoids heat exchange with the coolant system 63 (FIG. 1), which provides a comparatively slow thermal response.

Figure 3B:
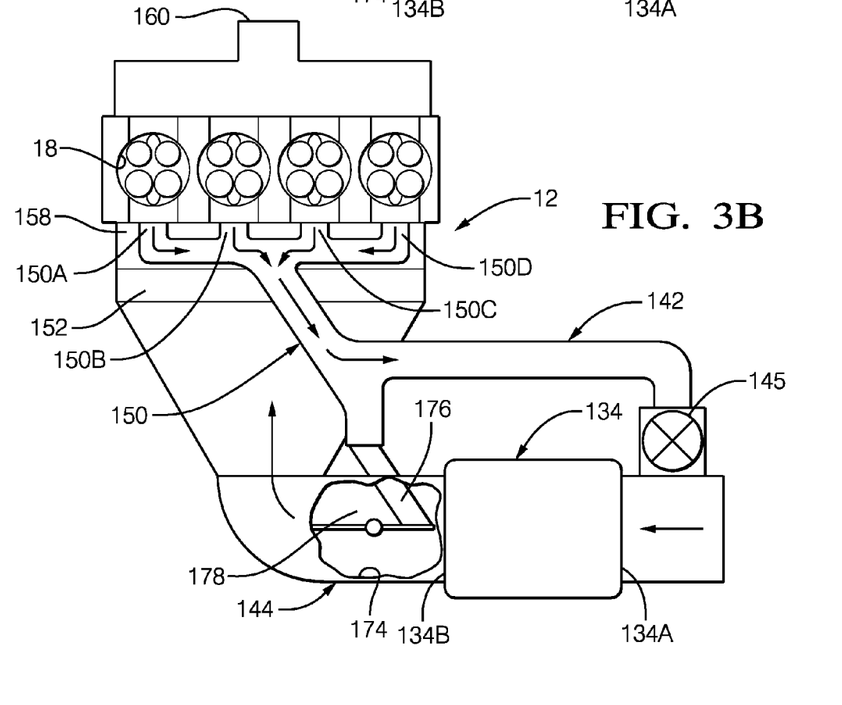
FIG. 3B is a schematic view of a portion of the intake air pathway operating in a cooling mode.

Referring to FIGS. 3B and 7, if the intake air temperature is greater than a second desired temperature (block 218), which may be different than the first desired temperature, charge air supplied from the compressor outlet 134B to the intake air heat exchanger 152 (block 222) in a cooling mode. With the second valve 145 open, air downstream from the intake air heat exchanger 152 is recirculated to the compressor inlet 134A (block 224) to decrease fluid temperature at the compressor outlet 134B. This may be done to provide cooler compressed air from the supercharger 134 as well as increase compressor efficiency and provide protection from high temperatures.

Once the desired intake air temperature is achieve, the first and second valves 144, 145 are regulated to maintain the intake air temperature (block 220). The position of the first and second valves 144, 145 can be regulated beyond fully opened or fully closed, if desired, to provide fine tuning of the intake air temperature and operation of the associated components.

Figure 6A:
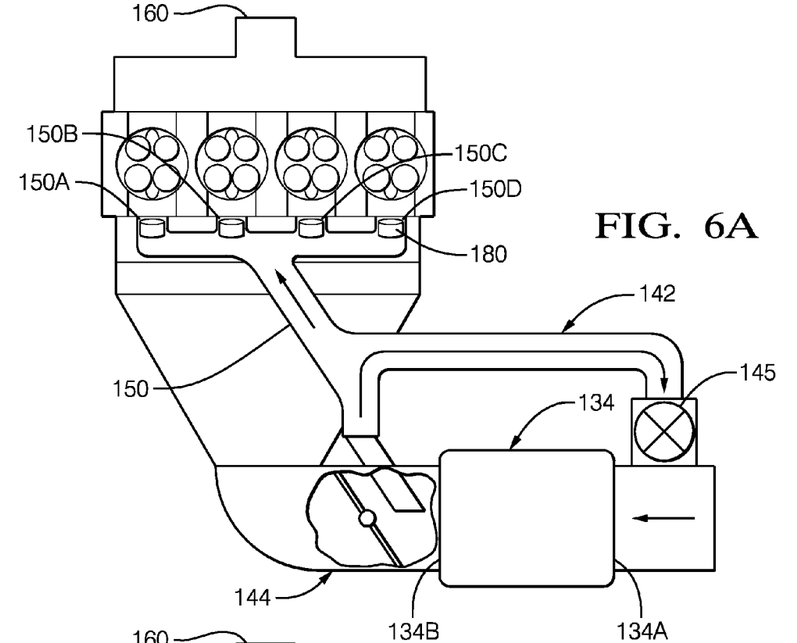
FIG. 6A is a schematic view of a portion of the intake air pathway in a heating mode with a first arrangement of electric heaters.
Figure 6B:
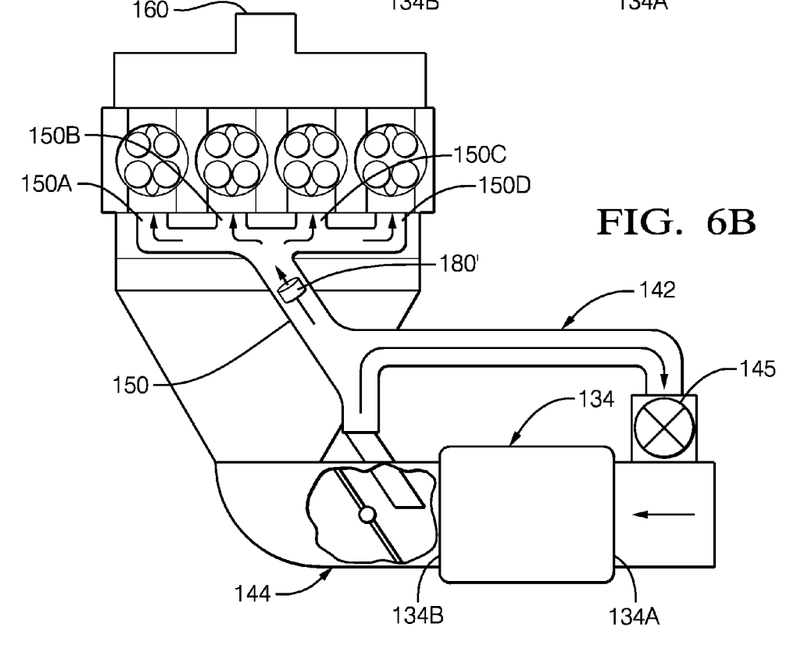
FIG. 6B is a schematic view of a portion of the intake air pathway in the heating mode with a heater in a second arrangement.

The heating mode is shown schematically in FIGS. 6A and 6B with heaters, if electric heating is still desired. In the first example illustrated in FIG. 6A, individual electric heaters 180 are arranged in each secondary intake ports 150A, 150B, 150C, 150D within the secondary intake manifold. In the example illustrated in FIG. 6B, the heater 180' can be provided upstream from the individual secondary intake ports. The heaters 180, 180' may be used instead of or in addition to the heaters 80 (FIG. 2). One such type of heater is available from Emitec under the tradename MET-ALIT. The electrical heating element can provide 3600 W of heat in about 1 second with a 12 volt source or as needed based on design requirements. By placing the heaters in the secondary intake manifold (second passage 150) rather than the intake manifold 158, the overall restriction of the intake air pathway may be reduced.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An engine control system comprising:
an intake manifold configured to supply intake air to a combustion chamber;
a sensor configured to detect a temperature associated with the intake air;
a compressor includes a compressor inlet and a compressor outlet;
an intake air heat exchanger fluidly arranged between the compressor outlet and the intake manifold;
a recirculation passage fluidly interconnect the compressor outlet to the compressor inlet;
a heat exchanger bypass passage fluidly interconnects the recirculation passage to the intake manifold and bypasses the intake air heat exchanger;
a charge air bypass valve arranged downstream from the compressor outlet and configured to regulate the flow of fluid from the compressor outlet to intake air heat exchanger and through the recirculation and heat exchanger bypass passages;
a compressor bypass valve arranged in the recirculation passage and configured to regulate the flow of air therethrough; and
a controller is in communication with the sensor and the charge air and compressor bypass valves, the controller is configured to provide a first command to the charge air bypass valve and a second command to the compressor bypass valve in response to the temperature detected by the sensor relative to a desired temperature to regulate flow of intake air through the recirculation and heat exchanger bypass passages and supply a desired temperature intake air to the combustion chamber.

2. The engine control system according to claim 1, wherein the sensor is a temperature sensor provided in the intake manifold.

3. The engine control system according to claim 1, wherein the compressor is a supercharger.

4. The engine control system according to claim 3, further comprising a turbocharger;
wherein the supercharger is arranged fluidly downstream from the turbocharger, a first charge air cooler is arranged fluidly between the turbocharger and the supercharger, and the intake air heat exchanger provides a second charge air cooler.

5. The engine control system according to claim 1, wherein the charge air bypass valve is a three-way valve.

6. The engine control system according to claim 1, wherein the compressor bypass valve is a two-way valve.

7. The engine control system according to claim 1, wherein at least one electric heater is provided in the second passage.

8. The engine control system according to claim 7, wherein the second passage is provided by a secondary intake manifold fluidly connected to the intake manifold upstream from the intake air heat exchanger, the at least one electric heater arranged in the secondary intake manifold.

9. The engine control system according to claim 8, wherein the secondary intake manifold has multiple secondary intake ports each respectively fluidly connected to a combustion chamber, the electric heater arranged in each of the secondary intake ports.

10. The engine control system according to claim 1, wherein the intake air temperature is below a first desired temperature, and the controller is configured to actuate the at least one of the first and second valves to recirculate the fluid from the compressor outlet to the compressor inlet and bypass the intake air heat exchanger with fluid from the compressor outlet to increase intake air temperature to the combustion chamber to the desired temperature intake air.

11. The engine control system according to claim 1, wherein the intake air temperature is above a second desired temperature, and the controller is configured to actuate the at least one of the first and second valves to supply fluid from the compressor outlet to the intake air heat exchanger and recirculate intake air downstream from the intake air heat exchanger to the compressor inlet to decrease fluid temperature at the compressor outlet.

12. A method of controlling intake air temperature for an internal combustion engine having a compressor, at least one sensor, a first valve positioned downstream from a compressor outlet and configured to regulate the flow of fluid from the compressor outlet to an intake air heat exchanger and through a recirculation passage and a heat exchanger bypass passage; a second valve positioned in the recirculation passage and configured to regulate a flow of air therethrough, and an engine controller, the method comprising the steps of:

determining an intake air temperature within a passage which is in fluid communication with a combustion chamber of the internal combustion engine via the at least one sensor;

via the controller, comparing the intake air temperature to a desired temperature; and controlling at least one of the first and second valves in a loop fluidly connecting the compressor outlet to a compressor inlet to control fluid flow to an intake air heat exchanger in fluid communication with the combustion chamber to deliver a desired intake air temperature to the combustion chamber.

13. The method according to claim 12, wherein the comparing step includes identifying the intake air temperature is below a first desired temperature, the controlling step includes actuating at least one of the first and second valves, via the controller, to recirculate the fluid from the compressor outlet to the compressor inlet and bypass the intake air heat exchanger with fluid from the compressor outlet to increase intake air temperature to the combustion chamber to the desired intake air temperature.

14. The method according to claim 12, wherein the comparing step includes identifying the intake air temperature is above a second desired temperature, the controlling step includes actuating the at least one of the first and second valves, via the controller, to supply fluid from the compressor outlet to the intake air heat exchanger and recirculate intake air downstream from the intake air heat exchanger to the compressor inlet to decrease fluid temperature at the compressor outlet.

15. The method according to claim 12, wherein the compressor is a supercharger.

16. The method according to claim 12, wherein the first valve is a three-way valve.

17. The method according to claim 12, wherein the second valve is a two-way valve.

* * * * *